UNITED STATES PATENT OFFICE.

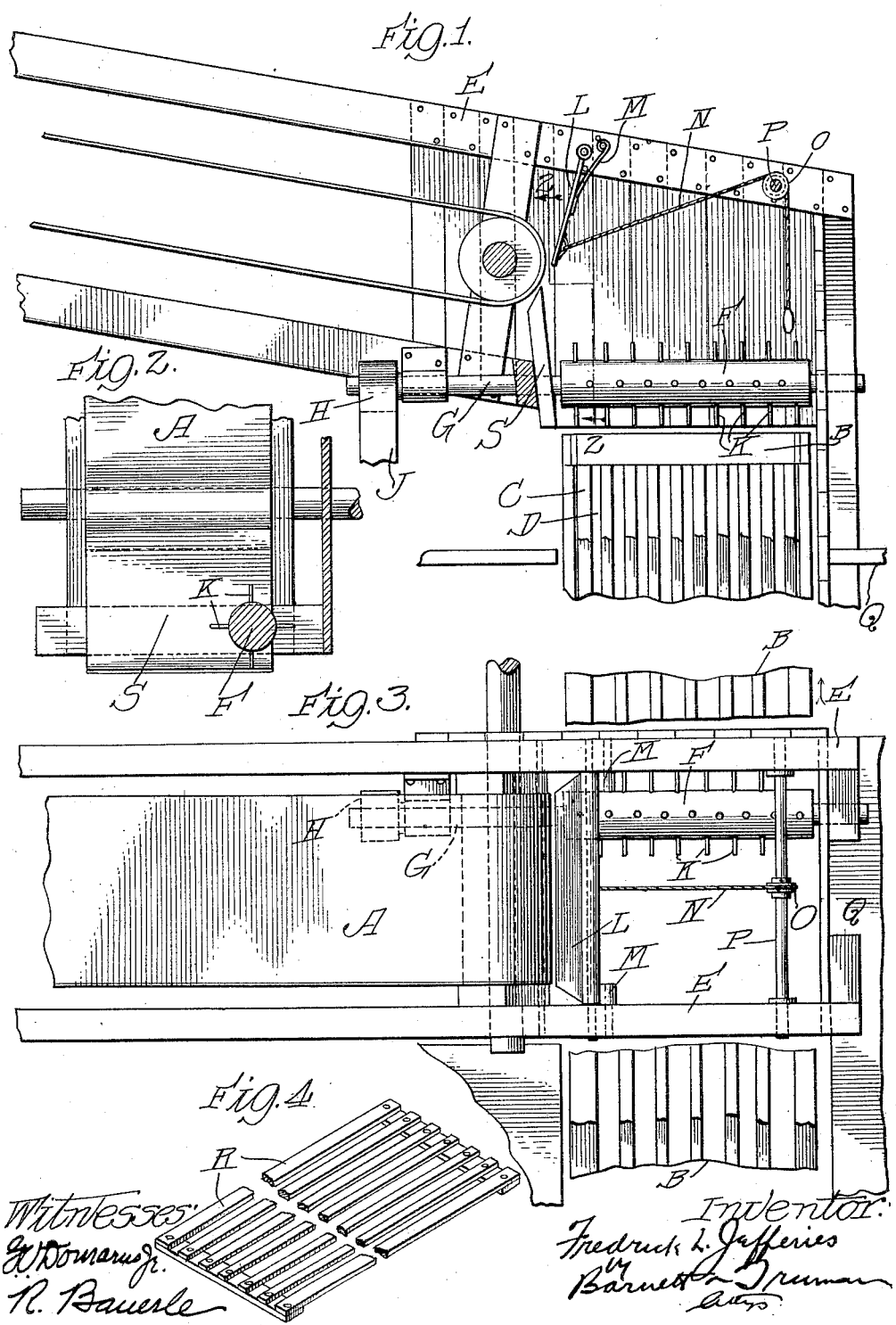

FREDRICK L. JEFFERIES, OF SUMMIT, ILLINOIS, ASSIGNOR TO CORN PRODUCTS REFINING COMPANY, A CORPORATION OF NEW JERSEY.

APPARATUS FOR FILLING STARCH-DRYING WAGONS.

1,071,237.  Specification of Letters Patent.  Patented Aug. 26, 1913.

Application filed January 27, 1913. Serial No. 744,469.

*To all whom it may concern:*

Be it known that I, FREDRICK L. JEFFERIES, a citizen of the United States, residing at Summit, in the county of Cook and State of Illinois, have invented certain new and useful Improvements in Apparatus for Filling Starch-Drying Wagons, of which the following is a specification.

My invention relates to the manufacture of starch, and particularly to the system of drying starch after it is taken from the settling tables which has been invented by Louis P. Bauer and disclosed in United States Letters Patent granted to the inventor August 13, 1912, No. 1,035,302. The characteristic feature of this system of drying is that instead of spreading the starch out on trays which are carried in horizontal position through the drying tunnels, the starch is dried in wagons provided with narrow compartments having foraminous sides and extending from top to bottom and from end to end of the wagon, these compartments being spaced apart so that spaces are provided for the circulation of hot air.

The object of my invention is to provide an improved form of apparatus for filling the wagons in a system of this sort; the invention consisting in a simple but efficient apparatus whereby the starch may be transported from the starch tables, broken up into particles small enough to enter the starch compartments, and uniformly distributed in the different compartments of the wagon. I lay no claim to the construction of the wagon.

The invention is illustrated, in a preferred embodiment, in the accompanying drawing wherein—

Figure 1 is a sectional view taken longitudinally of the conveyer and transversely of the wagon; Fig. 2, a detail section on line 2—2 of Fig. 1; Fig. 3, a plan view, and Fig. 4, a view, in perspective, of a slatted structure employed for preventing the starch from entering the circulation spaces in the wagon.

Like characters of reference designate like parts in the several figures of the drawing.

Referring to the drawing, A designates a belt conveyer which transports the starch from the settling table (not shown) to the place of loading into the wagons.

B designates a starch wagon which is divided, by suitable foraminous partitions, into a number of starch compartments C and intervening circulation spaces D which extend from top to bottom of the wagon from end to end thereof, and are open at the top; the construction of a wagon of this sort being shown in Patent No. 1,035,302 above referred to. The conveyer A terminates at the open side of a box or housing E which is preferably entirely open at the bottom. The wagon to be filled is positioned under this housing. Within the housing and preferably at its forward side (having reference to the direction in which the wagon is moved while being filled) is a breaking element consisting preferably of a roller F, the shaft G of which is mounted in suitable bearings and provided with a pulley H for the driving belt J, the roller being provided with prongs K. Pivotally mounted in the housing above the end of the conveyer is a valve or deflecting member L, a spring M preferably being employed to normally force the valve against the end of the conveyer. The purpose of the member L is primarily to govern the delivery of the starch from the conveyer. The lumps of starch vary in size and the distribution upon the belt is not always equal. The belt will ordinarily be run at quite a high speed and if some means were not provided for intercepting and controlling the delivery of the starch from the belt it would be likely to be thrown over to the farther side of the wagon. The deflector is manipulated by means of a cord N which extends over a sheave O on a shaft P mounted in the housing. A man standing on the platform Q, by giving the deflector an appropriate angular position, which may be varied as circumstances require, can properly distribute the starch as it comes from the belt. The wagon as filled is gradually moved forward, that is, in the direction shown by the arrow in Fig. 3. The breaking roller is kept in constant rotation and serves to break up the lumps of starch.

In order to prevent the starch from entering the circulation spaces D a slatted structure R (Fig. 4) is placed upon the wagon, the slats being arranged to cover the circulation spaces.

Ordinarily the starch wagons are filled one after another by a continuous operation. In such case, when a wagon has been filled, the deflecting member L is allowed to bear against the end of the conveyer and serves as a valve to hold back the starch until the filled wagon is removed and an empty one put in its place. Preferably a scraper S is provided which is secured to the housing and bears against or stands close to the belt A.

I claim:

In feeding apparatus for starch wagons of the character described, the combination with a continuously operating conveyer, of a housing open at the bottom and having an open side into which the conveyer delivers, a deflector pivoted to the housing above the delivery end of the conveyer and provided with manually operated means for changing its angular position, a spring which tends to force the lower end of the deflector against the delivery end of the conveyer, and a rotary breaking element in said housing below the conveyer.

FREDRICK L. JEFFERIES.

Witnesses:
P. W. TRUMAN,
L. A. FALKENBERG.

Copies of this patent may be obtained for five cents each, by addressing the "Commissioner of Patents, Washington, D. C."